United States Patent
Machinaka et al.

(10) Patent No.: US 11,912,850 B2
(45) Date of Patent: Feb. 27, 2024

(54) RESIN COMPOSITION FOR INSULATING LAYER, INSULATED ELECTRIC WIRE, AND CABLE

(71) Applicant: SUMITOMO ELECTRIC INDUSTRIES, LTD., Osaka (JP)

(72) Inventors: Syota Machinaka, Osaka (JP); Taro Fujita, Osaka (JP); Shigeyuki Tanaka, Osaka (JP); Nayu Yanagawa, Osaka (JP); Yuji Ochi, Tochigi (JP); Satoshi Okano, Tochigi (JP); Yuto Kobayashi, Tochigi (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 665 days.

(21) Appl. No.: 17/045,548

(22) PCT Filed: Mar. 11, 2019

(86) PCT No.: PCT/JP2019/009808
§ 371 (c)(1),
(2) Date: Oct. 6, 2020

(87) PCT Pub. No.: WO2019/198403
PCT Pub. Date: Oct. 17, 2019

(65) Prior Publication Data
US 2021/0163728 A1 Jun. 3, 2021

(51) Int. Cl.
*H01B 11/18* (2006.01)
*C08L 23/16* (2006.01)
*C08K 5/25* (2006.01)
*C08K 5/3472* (2006.01)
*H01B 3/44* (2006.01)

(52) U.S. Cl.
CPC ............... *C08L 23/16* (2013.01); *C08K 5/25* (2013.01); *C08K 5/3472* (2013.01); *H01B 3/441* (2013.01); *H01B 11/18* (2013.01); *C08L 2203/202* (2013.01); *C08L 2207/066* (2013.01)

(58) Field of Classification Search
CPC . H01B 3/30; H01B 3/441; H01B 7/02; H01B 7/04; H01B 7/06; H01B 7/08; H01B 7/295; H01B 3/44; H01B 7/34; C08K 3/22; C08K 2/25; C08K 5/3472; C08L 23/06; C08L 23/12; C08L 23/16; C08L 2203/202; C08L 2207/066
USPC ............ 174/110 R–110 N, 113 R, 115, 116; 428/379, 375; 524/436
See application file for complete search history.

(56) References Cited

U.S. PATENT DOCUMENTS

2009/0133926 A1  5/2009 Kambe
2014/0141240 A1* 5/2014 Segawa .................... C08K 3/22
                                                                524/436
2014/0141241 A1* 5/2014 Nishi ..................... C08K 5/372
                                                                428/379

FOREIGN PATENT DOCUMENTS

JP   H07-138417        5/1995
JP   2004-75993 A  *   3/2004 ............. C08L 23/10
JP   2004-349160       12/2004
(Continued)

*Primary Examiner* — William H. Mayo, III
(74) *Attorney, Agent, or Firm* — IPUSA, PLLC (57) ABSTRACT

A resin composition for an insulating layer includes: an olefinic resin as a main component; and a metal deactivator, wherein the olefinic resin consists of block polypropylene and polyethylene, and wherein a content of the polyethylene in the olefinic resin is greater than or equal to 1% by mass and less than or equal to 10% by mass.

7 Claims, 2 Drawing Sheets

(56) References Cited

FOREIGN PATENT DOCUMENTS

| | | | | |
|---|---|---|---|---|
| JP | 2005-190918 | | 7/2005 | |
| JP | 2007-063343 | | 3/2007 | |
| JP | 2007-063343 A * | | 3/2007 | ............. H01B 7/295 |
| JP | 2007-090787 | | 4/2007 | |
| JP | 2009-081132 | | 4/2009 | |
| JP | 2009-127040 | | 6/2009 | |
| JP | 2012-087184 A * | | 5/2012 | ............... H01B 7/02 |
| JP | 2012-097217 | | 5/2012 | |
| JP | 2015-164114 | | 9/2015 | |
| JP | 2016-105406 | | 6/2016 | |
| JP | 2016-181413 | | 10/2016 | |
| JP | 2017-179267 | | 10/2017 | |

* cited by examiner

RESIN COMPOSITION FOR INSULATING LAYER, INSULATED ELECTRIC WIRE, AND CABLE

TECHNICAL FIELD

The present disclosure relates to a resin composition for an insulating layer, an insulated electric wire, and a cable.

The present application is based on and claims priority to Japanese Patent Application No. 2018-074796, filed on Apr. 9, 2018, the entire contents of the Japanese Patent Application being hereby incorporated herein by reference.

BACKGROUND ART

Due to a need for automotive driving technology and driving assist functions, electric wires for in-vehicle information are required to further increase the capacity and speed of information transmission. Transmission losses have a positive correlation with the frequency of a signal and the dissipation factor of an insulating layer of a signal transmission cable. Therefore, for increasing the speed of signal transmission, it is required to reduce the dissipation factor of the insulating layer and further reduce the transmission losses in order to stably transmit signals.

A conventional art discloses a communication cable using an electrically insulating material containing a phenolic antioxidant that does not have a hindered phenol structure for an insulator layer to have a low dielectric loss of the insulator layer in a high frequency band and have a long life even when being used in a high temperature environment (see Japanese Laid-open Patent Publication No. 2009-81132).

PRIOR ART DOCUMENT

Patent Document

[Patent Document 1] Japanese Laid-open Patent Publication No. 2009-81132

SUMMARY OF THE INVENTION

According to one aspect of the present disclosure, a resin composition for an insulating layer includes: an olefinic resin as a main component; and a metal deactivator, wherein a content of the metal deactivator exceeds 0.05% by mass, and wherein a melting point of the metal deactivator is greater than or equal to 200° C.

According to another one aspect of the present disclosure, an insulated electric wire includes: one or more linear conductors; and one or more insulating layers layered on an outer peripheral surface of the one or more conductors and that use the resin composition for an insulating layer.

According to another one aspect of the present disclosure, a cable includes one or more such insulated electric wires.

EMBODIMENT FOR CARRYING OUT THE INVENTION

Problem to be Solved by the Present Disclosure

In the conventional art described above, if an insulating layer contains an additive such as an antioxidant, the dissipation factor may become larger. On the other hand, for insulating materials that are used for electric wires, it is required to consider deterioration by metal caused by conductors. In particular, in order to satisfy standards of ISO 6722-1 (2011) for which a heat-resistant aging test is performed with an electric wire with a conductor, it is desirable to reduce deterioration by metal as much as possible and enhance durability in a high-temperature environment.

In view of above, the present disclosure has an object to provide a resin composition for an insulating layer, an insulated electric wire, and a cable that enable to reduce the dissipation factor of an insulating layer and enable to inhibit deterioration by metal.

Effect of the Present Disclosure

According to the present disclosure, it is possible to provide a resin composition for an insulating layer, an insulated electric wire, and a cable that enable to reduce the dissipation factor of an insulating layer and enable to inhibit deterioration by metal.

DESCRIPTION OF EMBODIMENT OF THE PRESENT INVENTION

First, aspects of the present invention will be described by listing.

According to one aspect of the present invention, a resin composition for an insulating layer includes an olefinic resin as a main component; and a metal deactivator, wherein a content of the metal deactivator exceeds 0.05% by mass, and wherein a melting point of the metal deactivator is greater than or equal to 200° C.

According to the resin composition for an insulating layer, the dissipation factor can be effectively reduced by using the olefinic resin having a low polarity as the main component. Also, by the content of the metal deactivator exceeding 0.05% by mass and the melting point of the metal deactivator being greater than or equal to 200° C., it is possible to inhibit the deterioration by metal in a high temperature environment while suppressing an increase in the dissipation factor associated with thermal vibration of the constituent molecules of a dielectric. Therefore, according to the resin composition for an insulating layer, it is possible to reduce the dissipation factor of an insulating layer and to inhibit the deterioration by metal in a high temperature environment. Here, "deterioration by metal" generally means that oxidative deterioration of a material is promoted by a catalytic action of metal in contact.

It is preferable that the metal deactivator is a salicylic acid derivative, a phthalic acid derivative, or a combination thereof. In this manner, by the metal deactivator being a salicylic acid derivative, a phthalic acid derivative, or a combination thereof, it is possible to further enhance the effect of inhibiting deterioration by metal.

It is preferable that the olefinic resin is polyethylene, polypropylene, an ethylene-propylene copolymer, polymethylpentene, or a combination thereof. In this manner, by the olefinic resin being polyethylene, polypropylene, an ethylene-propylene copolymer, polymethylpentene, or a combination thereof, it is possible to further enhance the effect of reducing the dissipation factor of an insulating layer.

It is preferable that the olefinic resin is polypropylene and polyethylene. By the olefinic resin being such a combination, it is possible to enhance the durability of an insulating layer in a high-temperature environment (also referred to as "heat resistance"). Also, in this case, it is more preferable that the polyethylene is a low-density polyethylene. By the polyethylene being a low-density polyethylene, the heat resistance of the insulating layer can be further enhanced.

In a case in which the olefinic resin is polypropylene and polyethylene, it is preferable that the content of the polyethylene in the olefinic resin is greater than or equal to 1% by mass and less than or equal to 10% by mass. By the content of polyethylene in the olefin resin being in the above range, the heat resistance of the insulating layer can be further enhanced.

According to another one aspect of the present invention, an insulated electric wire includes: one or more linear conductors; and one or more insulating layers layered on an outer peripheral surface of the one or more conductors and that use the resin composition for an insulating layer.

Because the insulated electric wire includes one or more insulating layers using the resin composition for an insulating layer, the dissipation factor of the one or more insulating layers can be reduced and the deterioration by metal can be inhibited as described above. Therefore, the insulated electric wire including the one or more insulating layers enables to enhance the durability in a high-temperature environment and reduce the transmission losses.

Here, the "insulated electric wire" refers to an electric wire that includes a conductor and an insulating layer outside the conductor.

According to another one aspect of the present invention, a cable includes one or more such insulated electric wires.

Because the cable includes the one or more insulated electric wires, the dissipation factor of the one or more insulating layers can be reduced and the deterioration by metal can be inhibited. As a result, it is possible to enhance the durability in a high-temperature environment and reduce the transmission losses.

It is desirable that the cable is a Twinax cable. By the cable being a Twinax cable, a large capacity signal can be transmitted.

It is preferable that the cable is a coaxial cable. By the cable being a coaxial cable, it is possible to reduce the diameter.

It should be noted that in the present invention, the "main component" means a component with the highest content, for example, 50% by mass or more.

Details of Embodiment of the Present Invention

In the following, a resin composition for an insulating layer, an insulated electric wire, and a cable according to an embodiment of the present invention will be described with reference to the drawings as appropriate.

<Resin Composition for Insulating Layer>

The resin composition for an insulating layer includes an olefinic resin as a main component and includes a metal deactivator. Also, in the resin composition for an insulating layer, the content of the metal deactivator exceeds 0.05% by mass, and the melting point of the metal deactivator is greater than or equal to 200° C.

Examples of the olefinic resin that can be used include polypropylene (homopolymer, block polymer, random polymer), a polypropylene-based thermoplastic elastomer, a reactor-type polypropylene-based thermoplastic elastomer, a dynamic cross-linked polypropylene-based thermoplastic elastomer, polyethylene (high-density polyethylene (HDPE), linear low-density polyethylene (LLDPE), low-density polyethylene (LDPE), very low-density polyethylene (VLDPE)), an ethylene-propylene copolymer, polymethylpentene, an ethylene-vinyl acetate copolymer, an ethylene-ethyl acrylate copolymer, an ethylene-methyl methacrylate copolymer, an ethylene-methyl acrylate copolymer, an ethylene-methyl methacrylate copolymer, an ethylene-methyl methacrylate copolymer, an ethylene-butyl acrylate copolymer, an ethylene-propylene rubber, an ethylene-acrylate rubber, an ethylene-glycidyl methacrylate copolymer, a polyethylene-based resin such as an ethylene-methacrylate copolymer, an ionomer resin in which the molecules of an ethylene-methacrylate copolymer or an ethylene-acrylate copolymer are intermolecularly coupled with metal ions such as sodium or zinc. It is also possible to use one obtained by modifying such a resin with maleic anhydride or the like or one having an epoxy group, an amino group, or an imide group. It should be noted that "high-density polyethylene (HDPE)" refers to polyethylene with a density of 0.942 $g/cm^3$ or more. "Linear low-density polyethylene (LLDPE)" refers to polyethylene with a density of 0.910 $g/cm^3$ or more and less than 0.930 $g/cm^3$ that is obtained by copolymerizing ethylene and α-olefin. "Low-density polyethylene (LDPE)" refers to polyethylene with a density of 0.910 $g/cm^3$ or more and less than 0.930 $g/cm^3$ that is obtained by polymerizing ethylene by a high-pressure polymerization method. "Very-low density polyethylene (VLDPE)" refers to polyethylene with a density of 0.870 $g/cm^3$ or more and less than 0.910 $g/cm^3$. Examples of "polymethylpentene" include a homopolymer of 4-methyl-1-pentene and a copolymer of 4-methyl-1-pentene with 3-methyl-1-pentene or another α-olefin. Examples of the α-olefin include propylene, butene, pentene, hexene, heptene, octene, vinyl acetate, methyl acrylate, ethyl acrylate, methyl methacrylate, ethyl methacrylate, and the like.

Among these, polyethylene, polypropylene, an ethylene-propylene copolymer, polymethylpentene, or a combination thereof is preferable as the olefinic resin. In this manner, by the olefinic resin being polyethylene, polypropylene, an ethylene-propylene copolymer, polymethylpentene, or a combination thereof, it is possible to further enhance the effect of reducing the dissipation factor of an insulating layer.

It is preferable that the olefinic resin is polypropylene and polyethylene. By the olefin resin being such a combination, the heat resistance of the insulating layer can be enhanced. Also, as the polyethylene, a low-density polyethylene is preferable. By the polyethylene being a low-density polyethylene, the heat resistance of the insulating layer can be further enhanced.

In a case in which the olefinic resin is polypropylene and polyethylene, the lower limit of the content of the polyethylene in the olefinic resin is preferably 1% by mass and is more preferably 2% by mass. When the content of the polyethylene is less than the lower limit as described above, because the rate of the polypropylene component that is prone to oxidation degradation is large, it is difficult to further enhance the heat resistance of the insulating layer. On the other hand, the upper limit of the content of the polyethylene is preferably 10% by mass and is more preferably 8% by mass. When the content of the polyethylene exceeds the upper limit as describe above, a low melting point component increases and the viscosity decreases. Therefore, it may be difficult to further enhance the heat resistance of the insulating layer.

The lower limit of the content of the olefinic resin in the resin composition for an insulating layer is preferably 95% by mass and is more preferably 98% by mass. When the content of the olefin resin is less than the lower limit as described above, it may be difficult to reduce the dissipation factor of the resin composition for an insulating layer. On the other hand, the upper limit of the content of the olefin resin is preferably 99.9% by mass and is more preferably 99.5%. When the content of the olefin resin exceeds the upper limit as describe above, the content of the metal deactivator or the like in the resin composition for an insulating layer may be insufficient, and the effect of inhibiting the deterioration by metal in the resin composition for an insulating layer may not be sufficiently high.

(Metal Deactivator)

A metal deactivator stabilizes metal ions by chelation and inhibits deterioration of a covering resin caused by metal ions, that is, inhibits deterioration by metal. It is preferable that the metal deactivator according to the present embodiment is a copper deactivator.

The lower limit of the melting point of the metal deactivator is 200° C. and is more preferably 220° C. By the lower limit of the melting point of the metal deactivator being within the range as described above, the effect of reducing the dissipation factor of an insulating layer and the effect of inhibiting the deterioration by metal can be made favorable.

The metal deactivator is not particularly limited as long as the melting point is greater than or equal to 200° C. Examples of the metal deactivator include a salicylic acid derivative, a phthalic acid derivative, a compound of a triazole-based compound, an aromatic secondary amine-based compound, and the like. Examples of the salicylic acid derivative include 3-(N-salicyloyl)amino-1,2,4-triazole (product name: ADK STAB CDA-1, melting point: 315° C. to 325° C.), decamethylene dicarboxylic acid disalicyloyl hydrazide (product name: ADK STAB CDA-6, melting point: 209° C. to 215° C.), and the like. Examples of the phthalic acid derivative include isophthalic acid bis(2-phenoxypropionylhydrazide) (product name: CUNOX, melting point: 225° C.). Examples of the compound of a triazole-based compound include a compound containing, as the main component, 2-hydroxy-N-1H-1,2,4-triazol-3-ylbenzamide (product name: ADK STAB CDA-1M, melting point: 214° C. or more). Examples of the aromatic secondary amine compound include N,N'-di-2-naphthyl-p-phenylenediamine (product name: NOCRAC White, melting point: 225° C. or more).

Among these, from the viewpoint of further enhancing the effect of inhibiting deterioration by metal, a salicylic acid derivative, a phthalic acid derivative, or a combination thereof is preferable, and 3-(N-salicyloyl)amino-1,2,4-triazole and isophthalic acid bis(2-phenoxypropionylhydrazide) are preferable. Also, one or more of metal deactivators can be used.

The lower limit of the content of the metal deactivator in the resin composition for an insulating layer exceeds 0.05% by mass, is preferably 0.1% by mass, is more preferably 0.2% by mass, and is further more preferably 0.5% by mass. When the content of the metal deactivator is less than the lower limit as described above, it may be difficult to enhance the effect of inhibiting deterioration by metal. On the other hand, the upper limit of the content of the metal deactivator is preferably 5.0% by mass and is more preferably 2.0% by mass. When the content of the metal deactivator exceeds the upper limit as described above, an additive in the resin composition for an insulating layer may precipitate and crystallize from the resin onto the surface, resulting in an occurrence of bloom, which may impair the quality of the resin composition for an insulating layer.

The lower limit of the content of the metal deactivator with respect to 100 parts by mass of the olefinic resin is preferably 0.1 parts by mass, is more preferably 0.2 parts by mass, and is further more preferably 0.5 parts by mass. When the mass ratio of the metal deactivator is less than the lower limit as described above, it may be difficult to enhance the effect of inhibiting deterioration by metal. On the other hand, the upper limit of the mass ratio of the metal deactivator is preferably 5.0 parts by mass and is more preferably 2.0 parts by mass. When the mass ratio of the metal deactivator exceeds the upper limit as described above, an additive in the resin composition for an insulating layer may precipitate and crystallize from the resin onto the surface, resulting in an occurrence of bloom, which may impair the quality of the resin composition for an insulating layer.

(Other Components)

In addition to the polyolefin resin and the metal deactivator, the resin composition for an insulating layer may contain, for example, other components such as a resin other than the polyolefin resin, a flame retardant, a flame retardant aid, a pigment, and an antioxidant.

The flame retardant imparts flame a flame retardancy to an insulating layer that uses the resin composition for an insulating layer. Examples of the flame retardant include halogen-based flame retardants such as chlorine-based flame retardants and bromine-based flame retardants.

A flame retardant aid enhances the flame retardancy of an insulating layer that uses the resin composition for an insulating layer. Examples of a flame retardant aid include antimony trioxide and the like.

A pigment colors an insulating layer that uses the resin composition for an insulating layer. As a pigment, various kinds of pigments known in the art can be used, including, for example, titanium oxide and the like.

An antioxidant prevents oxidation of an insulating layer using the resin composition for an insulating layer. As an antioxidant, various kinds of antioxidants known in the art can be used, including, for example, phenolic antioxidants, and the like.

<Advantage>

According to the resin composition for an insulating layer, it is possible to reduce the dissipation factor of an insulating layer and to inhibit deterioration by metal in a high-temperature environment.

<Insulated Electric Wire>

Figure 1:
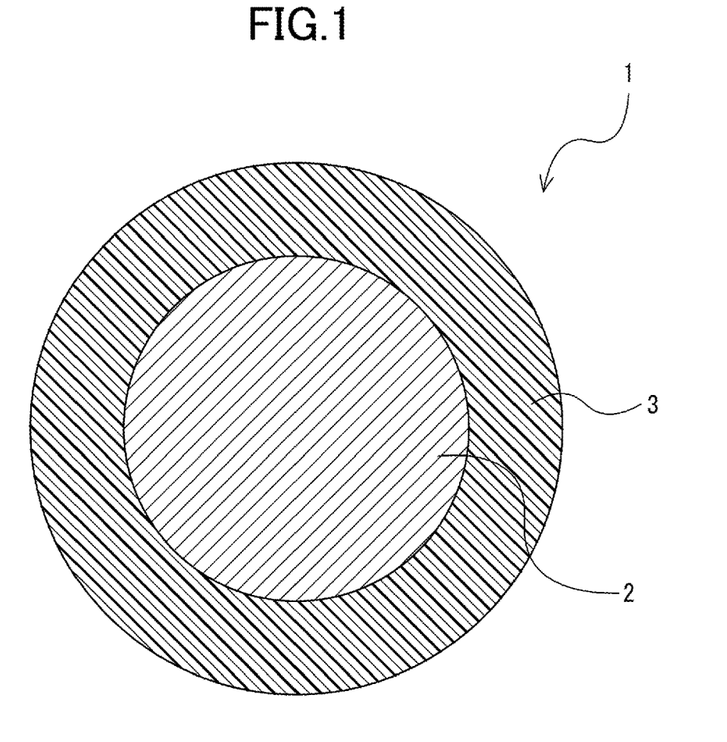
FIG. 1 is a schematic cross-sectional view of an insulated electric wire according to an embodiment of the present invention.

The insulated electric wire includes: one or more linear conductors; and one or more insulating layers layered on an outer peripheral surface of the one or more conductors and that use the resin composition for an insulating layer. FIG. 1 is a schematic cross-sectional view of an insulated electric wire according to an embodiment of the present invention. As illustrated in FIG. 1, an insulated electric wire 1 includes a linear conductor 2 and an insulating layer 3 that is layered on the outer peripheral surface of the conductor 2.

[Conductor]

For example, the conductor 2 is a round wire having a circular cross-sectional shape, but may be a square wire having a square cross-sectional shape, a rectangular wire having a rectangular cross-sectional shape, or a stranded wire obtained by twisting a plurality of element wires.

The material of the conductor 2 is preferably a metal having a high electrical conductivity and a high mechanical strength. Examples of such a metal include copper, a copper alloy, aluminum, an aluminum alloy, nickel, silver, soft iron, steel, stainless steel, and the like. For the conductor 2, it is possible to use a material in which these metals are linearly formed or a multilayered structure in which other metals are coated on such a linear material, for example, such as a nickel-coated copper wire, a silver-coated copper wire, a copper-coated aluminum wire, or a copper-coated steel wire.

The lower limit of the average cross-sectional area of the conductor 2 is preferably 0.01 mm$^2$ and is more preferably 0.1 mm$^2$. On the other hand, the upper limit of the average cross-sectional area of the conductor 2 is preferably 10 mm$^2$ and is more preferably 5 mm$^2$. When the average cross-sectional area of the conductor 2 is less than the lower limit, the volume of the insulating layer 3 relative to the conductor 2 may increase, and the volume efficiency of a coil or the like formed by using the insulated electric wire may be low. Conversely, when the average cross-sectional area of the conductor 2 exceeds the upper limit as described above, the insulating layer 3 is required to be formed thicker in order to sufficiently reduce the permittivity, and the insulated electric wire may be unnecessarily large in diameter. It should be noted that the "average cross-sectional area" of a conductor means an average value obtained by measuring the cross-sectional area of ten conductors.

[Insulating Layer]

The insulating layer 3 is formed on the outer peripheral surface of the conductor 2 by extrusion molding using the above described resin composition for an insulating layer.

The upper limit of the dissipation factor of the insulating layer 3 is preferably 2.00×10$^{-4}$ and is more preferably 1.80×10$^{-4}$. In a case in which the dissipation factor of the insulating layer 3 exceeds the upper limit as described above, it may be impossible to sufficiently enhance the effect of reducing transmission losses.

The lower limit of the average thickness of the insulating layer 3 is preferably 50 μm and is more preferably 100 μm. On the other hand, the upper limit of the average thickness of the insulating layer 3 is preferably 1500 μm and is more preferably 1000 μm. In a case in which the average thickness of the insulating layer 3 is less than the lower limit as described above, the insulation property may decrease. Conversely, in a case in which average thickness of the insulating layer 3 exceeds the upper limit as described above, the volume efficiency of a cable or the like formed by using the insulated electric wire may be low.

It should be noted that the "average thickness" of the insulating layer means the average value obtained by measuring the thickness of the insulating layer at ten locations.

[Method of Manufacturing Insulated Electric Wire]

Next, a method of manufacturing the insulated electric wire will be described. The insulated electric wire is formed by extrusion-molding the insulating layer 3. The method of manufacturing the insulated electric wire includes a step of covering by extrusion the outer peripheral surface of the conductor 2 with the resin composition for an insulating layer (extrusion step).

<Advantage>

Because the insulated electric wire includes one or more insulating layers using the resin composition for an insulating layer, the dissipation factor of the one or more insulating layers can be reduced and the deterioration by metal can be inhibited as described above. Therefore, the insulated electric wire including the one or more insulating layers enables to enhance the durability in a high-temperature environment and reduce the transmission losses.

<Cable>

The cable includes one or more such insulated electric wires. Examples of the cable include a Twinax cable and a coaxial cable.

[Twinax Cable]

Figure 2:
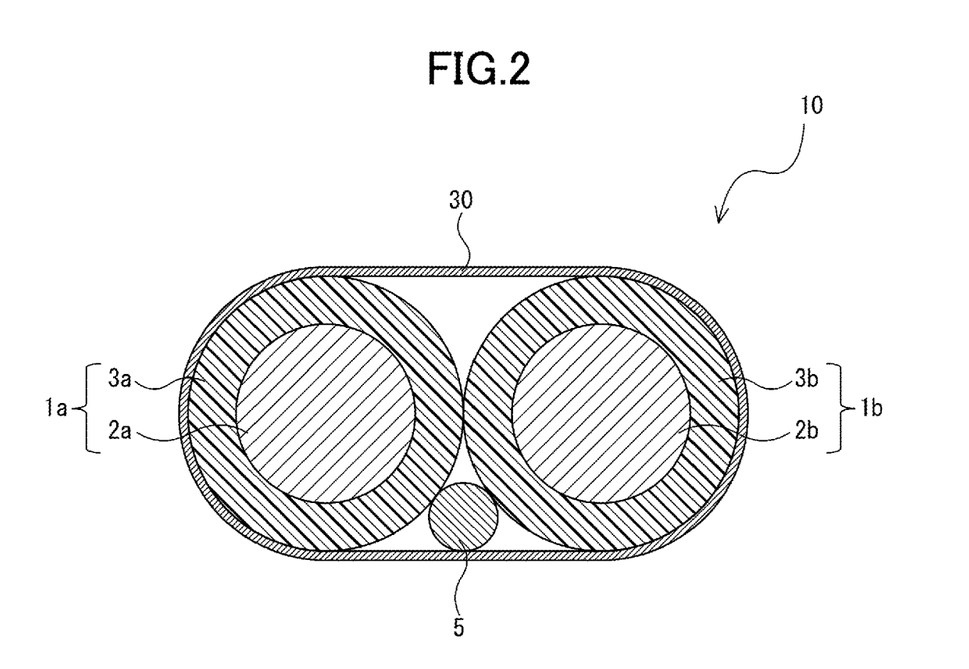
FIG. 2 is a schematic cross-sectional view of a Twinax cable according to an embodiment of the present invention.

FIG. 2 is a schematic cross-sectional view of a Twinax cable, which is an embodiment of the cable. As illustrated in FIG. 2, a Twinax cable 10 has a Twinax structure having a pair of insulated electric wires consisting of a first insulated electric wire 1a and a second insulated electric wire 1b per wire. The first insulated electric wire 1a includes a linear conductor 2a and one insulating layer 3a that is layered on the outer peripheral surface of the conductor 2a. The second insulated electric wire 1b includes a linear conductor 2b and one insulating layer 3b that is layered on the outer peripheral surface of the conductor 2b. For the first insulating layer 3a and the second insulating layer 3b, the resin composition for an insulating layer is used. Also, the Twinax cable 10 includes a drain wire 5 that is a third conductor and a shield tape 30 that is arranged to cover the pair of the insulated electric wire 1a and the insulated electric wire 1b and the drain wire 5.

By the cable being a Twinax cable, signal transmission can be more efficiently performed with high accuracy and high speed. Also, by the drain wire 5 being grounded, it is possible to prevent charging in the Twinax cable 10. Additionally, by including the shield tape 30, it is possible to prevent interference of electromagnetic noise from outside and reduce mutual interference between signal lines of signal line pairs.

The shield tape 30 is a tape that is obtained by providing a conductive layer on one surface of an insulating film made of a resin such as a polyvinyl chloride resin or a flame-retardant polyolefin resin. As the shield tape 30, a tape-like material such as, for example, a copper-vapor-deposited PET tape can be used. By including the shield tape 30, it is possible to prevent interference of electromagnetic noise from outside and reduce mutual interference between signal lines of signal line pairs. In the present embodiment, the shield tape 30 is arranged to cover the outer peripheral sides of the insulating layers 3a and 3b. The shielded tape 30 is arranged on the outer peripheral sides of the first insulating layer 3a and the second insulating layer 3b so as to fix the positional relationship between the first insulated electric wire 1a and the second insulated electric wire 1b relative to each other while encapsulating the first insulated electric wire 1a, the second insulated electric wire 1b, and the drain wire 5.

The Twinax cable 10 having such a Twinax structure is suitably used, as a cable for transmitting differential signals, in a field of requiring high speed communication.

[Method of Manufacturing Twinax Cable]

In a method of manufacturing a Twinax cable, which is an embodiment of the cable, for example, by collecting a first insulated electric wire and a second insulated electric wire, placing a drain wire that is a third conductor, and winding a shield tape around their outer periphery, a Twinax cable is manufactured.

[Coaxial Cable]

A coaxial cable, which is an embodiment of the cable, includes an insulated electric wire as described above, an outer conductor that covers the peripheral surface of the insulated electric wire, and a jacket layer that covers the peripheral surface of the outer conductor, wherein the insulated electric wire includes one conductor as described above and one insulating layer as described above that covers the peripheral surface of the conductor. An embodiment of the coaxial cable will be described with reference to FIG. 3 and FIG. 4.

Figure 3:
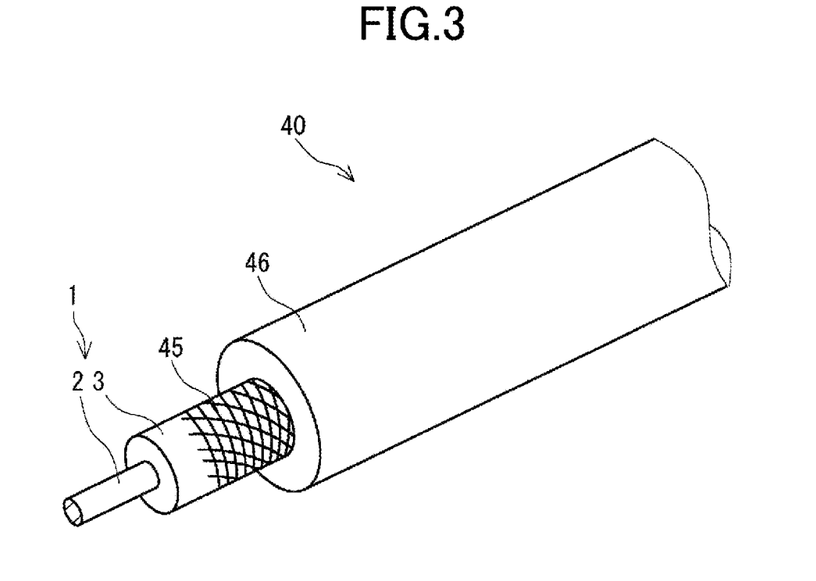
FIG. 3 is a schematic perspective view of a coaxial cable according to an embodiment of the present invention.
Figure 4:
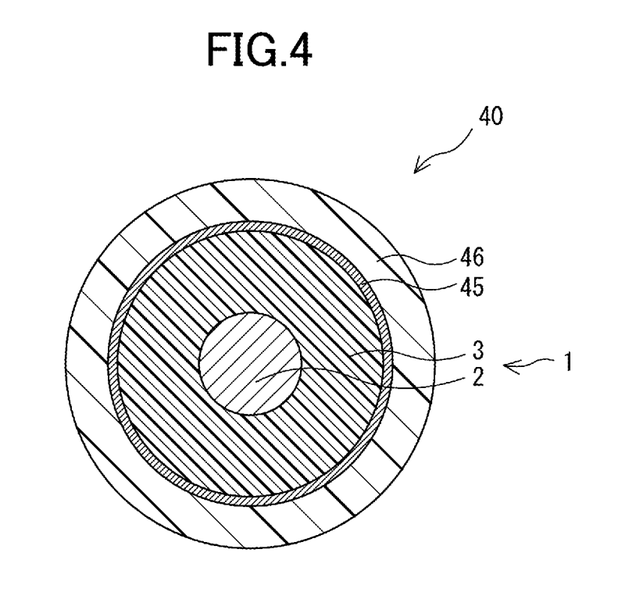
FIG. 4 is a schematic cross-sectional view of the coaxial cable of FIG. 3.

A coaxial cable 40 of FIG. 3 and FIG. 4 includes the insulated electric wire 1 including a conductor 2 and an insulating layer 3 that covers the peripheral surface of the conductor 2, an outer conductor 45 that covers the peripheral surface of the insulated electric wire 1, and a jacket layer 46 that covers the peripheral surface of the outer conductor 45. That is, the coaxial cable 40 has a configuration in which the conductor 2, the insulating layer 3, the outer conductor 45, and the jacket layer 46 are concentrically layered in the cross-sectional shape. By the cable being the coaxial cable 40, it is possible to reduce the diameter. Because the insulated electric wire 1, the conductor 2, and the insulating layer 3 are similar to those of the insulated electric wire 1 of FIG. 1, their descriptions are omitted with the same reference numerals.

The outer conductor 45 serves as being earthed, and serves as a shield to prevent electrical interference from other circuits. The outer conductor 45 covers the outer surface of the insulating layer 3. Examples of the outer conductor 45 may include a braided shield, a served shield, a tape shield, a conductive plastic shield, a metal tube shield, and the like. Among these, a braided shield and a tape shield are preferable from the viewpoint of high-frequency shielding. In a case in which a braided shield or a metal tube shield is used as the outer conductor 45, the number of shields may be determined as appropriate in accordance with the shield(s) to be used or the desired shielding property, and may be a single shield or multiple shields, such as double shields or triple shields.

The jacket layer 46 protects the conductor 2 and the outer conductor 45 and provides functions such as insulation, flame retardance, and weather resistance. It is preferable that the jacket layer 46 includes a thermoplastic resin as the main component.

Examples of the thermoplastic resin include polyvinyl chloride, a low-density polyethylene, a high-density polyethylene, expanded polyethylene, a polyolefin such as polypropylene, polyurethane, a fluoropolymer, and the like. Among these, polyolefin and polyvinyl chloride are preferable from the viewpoint of cost and ease of processing.

The materials described above may be used alone or two or more kinds may be used in combination, and may be selected as appropriate depending on the functions to be realized by the jacket layer 46.

[Method of Manufacturing Coaxial Cable]

The coaxial cable 40 is formed by covering the insulated electric wire 1 with the outer conductor 45 and the jacket layer 46.

Covering with the outer conductor 45 can be performed in a known method in accordance with a shielding method to be applied. For example, the braided shield can be formed by inserting the insulated electric wire 1 into a tubular braid and then reducing the diameter of the braid. For example, the served shield can be formed by winding a metal wire, such as copper wire, around the insulating layer 3. The tape shield can be formed by winding an electrically conductive tape, such as a laminated tape of aluminum and polyester, around the periphery of the insulating layer 3.

Covering with the jacket layer 46 can be performed in a similar manner to covering the conductor 2 with the insulating layer 3 of the insulated electric wire 1. Also, the thermoplastic resin or the like may be applied to the peripheral surface of the insulated electric wire 1 and the outer conductor 45.

<Advantage>

Because the cable includes the insulated electric wire, it is possible to reduce the dissipation factor of the insulating layer and to inhibit deterioration by metal, and thereby it is possible to enhance durability in a high-temperature environment and reduce transmission losses.

Other Embodiments

The embodiment disclosed above should be considered exemplary in all respects and not limiting. The scope of the present invention is not limited to configurations of the above described embodiment, but is indicated by claims and is intended to include all changes within the meaning and scope of equivalence with the claims.

The cable may be a multicore cable in which a plurality of Twinax cables are further covered by a jacket. Making a multicore cable enables to transmit a larger capacity signal in comparison to a Twinax cable.

Conductors can also be formed of stranded wires having a plurality of metal wires twisted together. In this case, multiple types of metal wires may be combined. Generally, the number of twists is seven or more.

The insulated electric wire may include a primer layer that is directly layered on a conductor. As the primer layer, one that is obtained by crosslinking a crosslinking resin, such as ethylene, which does not contain a metal hydroxide, can be preferably used. By providing such a primer layer, it is possible to prevent the peeling property of the insulating layer and the conductor from decreasing over time, thereby preventing the efficiency of the wiring operation from decreasing.

EXAMPLES

Although the present invention will be described in further detail with reference to the following examples, the present invention is not limited to the following examples.

[Insulated Electric Wires No. 1 to No. 38] Polypropylene (NOVATEC BC6C, manufactured by Japan Polypropylene Corporation, a block type polypropylene) as an olefinic resin as the main component and a metal deactivator were mixed so that the contents (parts by mass) were as indicated in Table 1 and Table 2, and resin compositions for an insulating layer of No. 1 to No. 38 were prepared.

As a metal deactivator, 3-(N-salicyloyl)amino-1,2,4-triazole (manufactured by ADEKA corporation, product name: ADK STAB CDA-1, melting point: 315° C. to 325° C.) that is represented by the following Chemical 1, isophthalic acid bis(2-phenoxypropionylhydrazide) (manufactured by MITSUI FINE CHEMICALS, Inc., product name: CUNOX, melting point: 225° C.) that is represented by the following Chemical 2, and N,N'-bis[3-(3,5-di-t-butyl-4-hydroxoxyphenyl) propionyl]hydrazine (manufactured by Chiba Japan K.K., product name: Irganox MD1024, melting point: 60° C. to 67° C.) that is represented by the following Chemical 3 were used.

[Chemical 1]

(K-1)

[Chemical 2]

(K-2)

[Chemical 3]

(K-3)

TABLE 1

|  |  |  | No. 1 | No. 2 | No. 3 | No. 4 | No. 5 | No. 6 |
|---|---|---|---|---|---|---|---|---|
| COMPONENTS OF RESIN COMPOSITION FOR INSULATING LAYER | PP (PARTS BY MASS) | NOVATEC BC6C | 100 | 100 | 100 | 100 | 100 | 100 |
|  | METAL DEACTIVATOR (PARTS BY MASS) | ADK STAB CDA-1 MELTING POINT 315~325° C. | 0.01 | 0.02 | 0.05 | 0.10 | 0.20 | 0.50 |
|  |  | CUNOX MELTING POINT 225° C. | — | — | — | — | — | — |
|  |  | IRGANOX MD1024 MELTING POINT 60~67° C. | — | — | — | — | — | — |
| EVALUATION | DISSIPATION FACTOR (tan δ) 10 GHz |  | $1.67 \times 10^{-4}$ | $1.65 \times 10^{-4}$ | $1.63 \times 10^{-4}$ | $1.62 \times 10^{-4}$ | $1.20 \times 10^{-4}$ | $1.64 \times 10^{-4}$ |
|  | HEAT RESISTANCE |  | B | B | B | A | A | A |
|  |  |  | No. 7 | No. 8 | No. 9 | No. 10 | No. 11 | No. 12 |
| COMPONENTS OF RESIN COMPOSITION FOR INSULATING LAYER | PP (PARTS BY MASS) | NOVATEC BC6C | 100 | 100 | 100 | 100 | 100 | 100 |
|  | METAL DEACTIVATOR (PARTS BY MASS) | ADK STAB CDA-1 MELTING POINT 315~325° C. | 1.00 | 2.00 | 5.00 | — | — | — |
|  |  | CUNOX MELTING POINT 225° C. | — | — | — | 0.01 | 0.02 | 0.05 |
|  |  | IRGANOX MD1024 MELTING POINT 60~67° C. | — | — | — | — | — | — |
| EVALUATION | DISSIPATION FACTOR (tan δ) 10 GHz |  | $1.43 \times 10^{-4}$ | $1.19 \times 10^{-4}$ | $1.18 \times 10^{-4}$ | $1.17 \times 10^{-4}$ | $1.18 \times 10^{-4}$ | $1.36 \times 10^{-4}$ |
|  | HEAT RESISTANCE |  | A | A | A | B | B | B |

TABLE 1-continued

| | | | No. 13 | No. 14 | No. 15 | No. 16 | No. 17 | No. 18 |
|---|---|---|---|---|---|---|---|---|
| COMPONENTS OF RESIN COMPOSITION FOR INSULATING LAYER | PP (PARTS BY MASS) | NOVATEC BC6C | 100 | 100 | 100 | 100 | 100 | 100 |
| | METAL DEACTIVATOR (PARTS BY MASS) | ADK STAB CDA-1 MELTING POINT 315~325° C. | — | — | — | — | — | — |
| | | CUNOX MELTING POINT 225° C. | 0.10 | 0.20 | 0.50 | 1.00 | 2.00 | 5.00 |
| | | IRGANOX MD1024 MELTING POINT 60~67° C. | — | — | — | — | — | — |
| EVALUATION | DISSIPATION FACTOR (tan δ) 10 GHz | | $1.23 \times 10^{-4}$ | $1.28 \times 10^{-4}$ | $1.31 \times 10^{-4}$ | $1.48 \times 10^{-4}$ | $1.65 \times 10^{-4}$ | $1.80 \times 10^{-4}$ |
| | HEAT RESISTANCE | | A | A | A | A | A | A |

TABLE 2

| | | | No. 19 | No. 20 | No. 21 | No. 22 | No. 23 |
|---|---|---|---|---|---|---|---|
| COMPONENTS OF RESIN COMPOSITION FOR INSULATING LAYER | PP (PARTS BY MASS) | NOVATEC BC6C | 100 | 100 | 100 | 100 | 100 |
| | METAL DEACTIVATOR (PARTS BY MASS) | ADK STAB CDA-1 MELTING POINT 315~325° C. | — | — | — | — | — |
| | | CUNOX MELTING POINT 225° C. | — | — | — | — | — |
| | | IRGANOX MD1024 MELTING POINT 60~67° C. | — | 0.01 | 0.02 | 0.05 | 0.10 |
| EVALUATION | DISSIPATION FACTOR (tan δ) 10 GHz | | $1.67 \times 10^{-4}$ | $1.43 \times 10^{-4}$ | $1.50 \times 10^{-4}$ | $1.77 \times 10^{-4}$ | $2.23 \times 10^{-4}$ |
| | HEAT RESISTANCE | | B | B | B | B | A |

| | | | No. 24 | No. 25 | No. 26 | No. 27 | No. 28 |
|---|---|---|---|---|---|---|---|
| COMPONENTS OF RESIN COMPOSITION FOR INSULATING LAYER | PP (PARTS BY MASS) | NOVATEC BC6C | 100 | 100 | 100 | 100 | 100 |
| | METAL DEACTIVATOR (PARTS BY MASS) | ADK STAB CDA-1 MELTING POINT 315~325° C. | — | — | — | — | — |
| | | CUNOX MELTING POINT 225° C. | — | — | — | — | — |
| | | IRGANOX MD1024 MELTING POINT 60~67° C. | 0.20 | 0.50 | 1.00 | 2.00 | 5.00 |

TABLE 2-continued

| EVALUATION | DISSIPATION FACTOR (tan δ) 10 GHz | $3.01 \times 10^{-4}$ | $3.56 \times 10^{-4}$ | $6.35 \times 10^{-4}$ | $12.97 \times 10^{-4}$ | $22.85 \times 10^{-4}$ |
|---|---|---|---|---|---|---|
| | HEAT RESISTANCE | A | A | A | A | A |

TABLE 3

| | | | No. 29 | No. 30 | No. 31 | No. 32 | No. 33 |
|---|---|---|---|---|---|---|---|
| COMPONENTS OF RESIN COMPOSITION FOR INSULATING LAYER | PP (PARTS BY MASS) | NOVATEC BC6C | 100 | 97 | 95 | 90 | 99.5 |
| | HDPE (PARTS BY MASS) | HDPE Tm 120~140° C. | — | 3 | 5 | 10 | — |
| | LDPE (PARTS BY MASS) | LDPE Tm 100~120° C. | — | — | — | — | 0.5 |
| | METAL DEACTIVATOR (PARTS BY MASS) | ADK STAB CDA-1 MELTING POINT 315~325° C. | 0.20 | 0.20 | 0.20 | 0.20 | 0.20 |
| | | CUNOX MELTING POINT 225° C. | — | — | — | — | — |
| | | IRGANOX MD1024 MELTING POINT 60~67° C. | — | — | — | — | — |
| EVALUATION | DISSIPATION FACTOR (tan δ) 10 GHz | | $1.49 \times 10^{-4}$ | $1.53 \times 10^{-4}$ | $1.21 \times 10^{-4}$ | $1.44 \times 10^{-4}$ | $1.65 \times 10^{-4}$ |
| | HEAT RESISTANCE 100° C. × 3000 HOURS | | A | A | A | A | A |
| | HEAT RESISTANCE 150° C. × 240 HOURS | | A | B | B | B | A |
| | HEAT RESISTANCE 175° C. × 30 MINUTES | | B | A | A | A | B |

| | | | No. 34 | No. 35 | No. 36 | No. 37 | No. 38 |
|---|---|---|---|---|---|---|---|
| COMPONENTS OF RESIN COMPOSITION FOR INSULATING LAYER | PP (PARTS BY MASS) | NOVATEC BC6C | 99 | 97 | 95 | 90 | 85 |
| | HDPE (PARTS BY MASS) | HDPE Tm 120~140° C. | — | — | — | — | — |
| | LDPE (PARTS BY MASS) | LDPE Tm 100~120° C. | 1 | 3 | 5 | 10 | 15 |
| | METAL DEACTIVATOR (PARTS BY MASS) | ADK STAB CDA-1 MELTING POINT 315~325° C. | 0.20 | 0.20 | 0.20 | 0.20 | 0.20 |
| | | CUNOX MELTING POINT 225° C. | — | — | — | — | — |
| | | IRGANOX MD1024 MELTING POINT 60~67° C. | — | — | — | — | — |

TABLE 3-continued

| EVALUATION | DISSIPATION FACTOR (tan δ) 10 GHz | $1.52 \times 10^{-4}$ | $1.34 \times 10^{-4}$ | $1.14 \times 10^{-4}$ | $1.84 \times 10^{-4}$ | $1.18 \times 10^{-4}$ |
|---|---|---|---|---|---|---|
| | HEAT RESISTANCE 100° C. × 3000 HOURS | A | A | A | A | A |
| | HEAT RESISTANCE 150° C. × 240 HOURS | A | A | A | A | A |
| | HEAT RESISTANCE 175° C. × 30 MINUTES | A | A | A | A | B |

<Evaluation>

Evaluation of the dissipation factor and the heat resistant aging test were performed on the resin compositions No. 1 to No. 38 for insulating layers obtained as described above.

(Evaluation of Dissipation Factor)

A sheet-shaped sample obtained by press-molding the resin composition for an insulating layer was prepared. For the conditions of press-molding, it was preheated at 180° C. for 5 minutes, then it was pressurized at that temperature and held for 5 minutes. With respect to the sheet-shaped sample, according to a method in accordance with JIS-R1641 (2007), the dissipation factor (tan δ) in a case in which a high frequency electric field with a frequency of 10 GHz was applied was measured. The measurement was performed three times and the average value was calculated. The measurement results are indicated in Table 1 and Table 2.

(Heat Resistance Aging Test)

The heat resistance of each of the insulated electric wires No. 1 to No. 28 was evaluated according to Long Term Heat Aging CLASS B (100° C.×3000 hours) of ISO 6722-1 (2011), and those that passed were defined as "A" and those that failed were defined as "B". The heat resistance of each of the insulated electric wires No. 29 to No. 38 was evaluated according to ISO 6722-1 (2011) Long Term Heat Aging CLASS B (100° C.×3000 hours), Short Term Heat Aging CLASS C (150° C.×240 hours), and Thermal Overload CLASS C (175° C.×30 minutes) of ISO 6722-1 (2011). For each of the tests, those that passed were defined as "A" and those that failed were defined as "B".

As indicated by the results of Table 1 and Table 2 above, the insulated electric wires No. 4 to No. 9 and No. 13 to No. 18, each using a resin compositions for an insulating layer in which the content of the metal inhibitor exceeded 0.05% by mass and the melting point of the metal inhibitor was greater than or equal to 200° C., were excellent in the effect of suppressing the dissipation factor of the insulating layer and in the heat resistance.

On the other hand, for the insulated electric wires No. 1 to No. 3 and No. 10 to No. 12, each using a resin composition for an insulating layer in which the content of the metal deactivator having a melting point of 200° C. or more was less than or equal to 0.05% by mass or less, the insulated electric wire No. 19, using a resin composition for an insulating layer having no metal deactivator, and the insulated electric wires No. 20 to No. 28 each using a resin composition for an insulating layer containing a metal deactivator whose melting point was less than 200° C., the dissipation factor was a high value exceeding $2.00 \times 10^{-4}$ or the heat resistance was inferior.

Table 3 indicates the effects of types of olefin resins on the insulated electric wires each using the resin composition for an insulating layer. The insulated electric wire No. 29 is an insulated electric wire using a resin composition for an insulating layer in which the olefinic resin is polypropylene. The insulated electric wires No. 30 to No. 32 are insulated electric wires each using an insulating resin composition for an insulating layer in which the olefinic resin is polypropylene and a high-density polyethylene and the content of polyethylene in the olefinic resin is greater than or equal to 1% by mass and less than or equal to 10% by mass. The insulated electric wires No. 34 to No. 37 are insulated electric wires each using a resin composition for an insulating layer in which the olefinic resin is polypropylene and a low-density polyethylene and the content of polyethylene of the olefinic resin is greater than or equal to 1% by mass and less than or equal to 10% by mass. The insulated electric wires No. 33 and No. 38 are insulated electric wires each using a resin composition for an insulating layer in which the olefinic resin is polypropylene and a low-density polyethylene, but the content of polyethylene in the olefinic resin is less than 1% by mass or greater than 10% by mass. The insulated electric wires No. 29 to No. 38 were excellent in the effect of suppressing the dissipation factor of the insulating layer. For the insulated electric wires No. 30 to No. 32, although the heat resistance at 150° C.×240 hours decreased, the heat resistance at 175° C.×30 minutes was enhanced in comparison to the insulated electric wire No. 29. Also, for the insulated electric wire No. 34 to No. 37, both the heat resistance at 150° C.×240 hours and the heat resistance at 175° C.×30 minutes were enhanced in comparison to the insulated electric wire No. 29. On the other hand, the insulated electric wires No. 33 and No. 38 showed no enhancement in heat resistance in comparison to the insulated electric wire No. 29.

DESCRIPTION OF THE REFERENCE NUMERALS 1, 1a, 1b insulated electric wire
2, 2a, 2b conductor
3, 3a, 3b insulating layer
5 drain wire
10 Twinax cable
30 shield tape
40 coaxial cable
45 outer conductor
46 jacket layer

The invention claimed is:

1. A resin composition for an insulating layer comprising:
an olefinic resin as a main component; and
a metal deactivator,
wherein a content of the metal deactivator exceeds 0.05% by mass,
wherein a melting point of the metal deactivator is greater than or equal to 200° C.,
wherein the olefinic resin consists of block polypropylene and polyethylene, and
wherein a content of the polyethylene in the olefinic resin is greater than or equal to 1% by mass and less than or equal to 10% by mass.

2. The resin composition for an insulating layer according to claim 1, wherein the metal deactivator is a salicylic acid derivative, a phthalic acid derivative, or a combination thereof.

3. The resin composition for an insulating layer according to claim 1, wherein the polyethylene is a low-density polyethylene.

4. An insulated electric wire comprising:
one or more linear conductors; and
one or more insulating layers layered on an outer peripheral surface of the one or more conductors and that use the resin composition for an insulating layer according to claim 1.

5. A cable comprising one or more insulated electric wires according to claim 4.

6. The cable according to claim 5, wherein the cable is a Twinax cable.

7. The cable according to claim 5, wherein the cable is a coaxial cable.

* * * * *